United States Patent
Kurtz et al.

(10) Patent No.: US 11,024,103 B2
(45) Date of Patent: Jun. 1, 2021

(54) METHOD FOR SHARING AND RECEIVING VEHICLE FUEL QUALITY ALERTS

(71) Applicant: Ford Global Technologies, LLC, Dearborn, MI (US)

(72) Inventors: Eric Matthew Kurtz, Dearborn, MI (US); Daniel Joseph Styles, Canton, MI (US); Daniel A. Makled, Dearborn, MI (US); Brien Lloyd Fulton, Bloomfield Hills, MI (US); Lauren Newton, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 255 days.

(21) Appl. No.: 16/190,602

(22) Filed: Nov. 14, 2018

(65) Prior Publication Data

US 2019/0080530 A1    Mar. 14, 2019

Related U.S. Application Data

(62) Division of application No. 15/258,660, filed on Sep. 7, 2016, now Pat. No. 10,163,278.

(51) Int. Cl.

| | | |
|---|---|---|
| G07C 5/08 | (2006.01) | |
| F02D 41/02 | (2006.01) | |
| F02D 41/22 | (2006.01) | |
| G07C 5/00 | (2006.01) | |
| G01S 19/14 | (2010.01) | |
| G01S 19/13 | (2010.01) | |

(52) U.S. Cl.
CPC ......... *G07C 5/0808* (2013.01); *F02D 41/021* (2013.01); *F02D 41/22* (2013.01); *F02D 41/221* (2013.01); *G01S 19/13* (2013.01); *G01S 19/14* (2013.01); *F02D 2200/0612* (2013.01); *F02D 2200/701* (2013.01); *G07C 5/008* (2013.01); *Y02T 10/40* (2013.01)

(58) Field of Classification Search
None
See application file for complete search history.

(56) References Cited

U.S. PATENT DOCUMENTS

| | | | |
|---|---|---|---|
| 6,366,199 B1 | 4/2002 | Osborn et al. | |
| 7,092,803 B2 | 8/2006 | Kapolka et al. | |
| 7,599,843 B2 | 10/2009 | Watkins et al. | |
| 8,185,293 B2 | 5/2012 | Jiang et al. | |
| 9,619,947 B2 | 4/2017 | Wenzel et al. | |
| 10,094,308 B2 * | 10/2018 | Kolhouse | G07C 5/0825 |
| 2011/0071724 A1 | 3/2011 | Heine et al. | |
| 2011/0231055 A1 | 9/2011 | Knight et al. | |
| 2012/0041637 A1 | 2/2012 | Allemang | |
| 2016/0232725 A1 | 8/2016 | Plowman et al. | |
| 2017/0305439 A1 | 10/2017 | Mayer et al. | |

FOREIGN PATENT DOCUMENTS

| | | |
|---|---|---|
| EP | 1001385 A2 | 5/2000 |
| KR | 20140098359 A | 8/2014 |

* cited by examiner

*Primary Examiner* — Todd Melton
(74) *Attorney, Agent, or Firm* — Geoffrey Brumbaugh; McCoy Russell LLP

(57) ABSTRACT

Methods and systems are provided for a vehicle wirelessly communicating with a central server. In one example, a method may include monitoring faults and sending engine conditions along with driver inputs to the central server for processing.

12 Claims, 10 Drawing Sheets

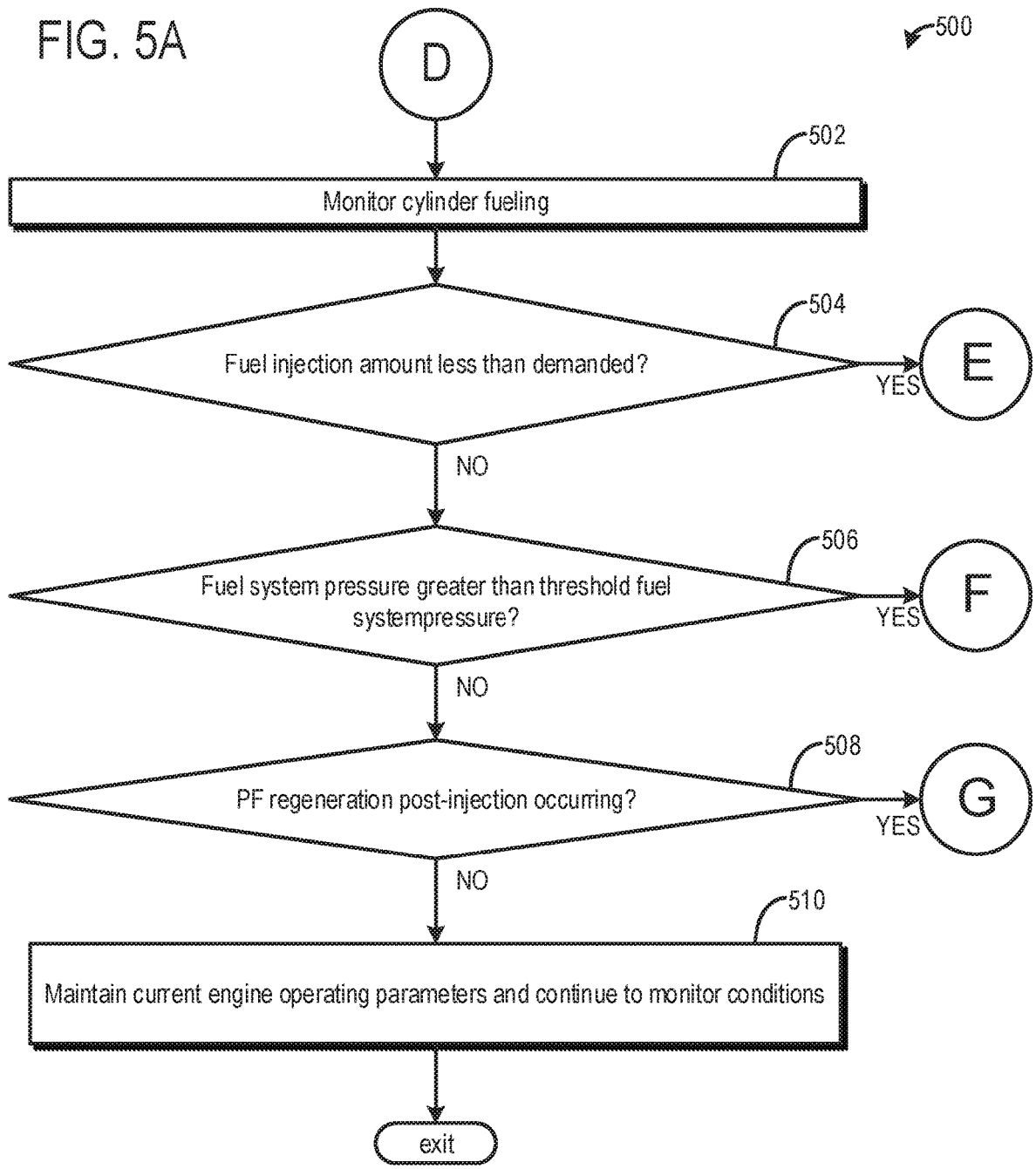

METHOD FOR SHARING AND RECEIVING VEHICLE FUEL QUALITY ALERTS

CROSS REFERENCE TO RELATED APPLICATION

The present application is a divisional of U.S. patent application Ser. No. 15/258,660, entitled "METHOD FOR SHARING AND RECEIVING VEHICLE FUEL QUALITY ALERTS," filed on Sep. 7, 2016. The entire contents of the above-referenced application are hereby incorporated by reference in its entirety for all purposes.

FIELD

The present description relates generally to methods and systems for monitoring vehicle conditions, relaying information to a remote location for processing, and/or adjusting operating parameters based on instructions from the remote location.

BACKGROUND/SUMMARY

More sophisticated vehicle condition management is realized with the addition of computers and other electronic components to vehicle systems. However, even with the addition computers, vehicle maintenance is often reactive. In such an example, a vehicle technician may be the first to receive and process data measured by the computer during vehicle activity. Alternatively, with the ubiquity of internet and other wireless connectivity systems, vehicle computers may relay information sensed during vehicle activity to a central server for processing.

In one example, a plurality of information related to a vehicle fault may be provided to the central server. However, portions of the information may be ambiguous and/or irrelevant to the central server. Thus, as recognized by the inventors herein, processing the information and determining what portions of the information are useful may be difficult, time consuming, and expensive.

Other attempts to address providing vehicle information to a remote location include providing vehicle information during a fault code. One example approach is shown by Allemang et al. in U.S. 20120041637. Therein, vehicle information is sent to a remote data storage center in response to a fault code. The information may be used to construct a repair plan to address the fault code of the vehicle.

However, the inventors herein have recognized potential issues with such systems. Often the operator may be taking actions that are at the root of the particular issue being diagnosed, and/or creating situations in which the vehicle restricts its performance to avoid degradation. For example, rapid tip-outs in direct injection engine systems may often create over-pressure situations, but only under certain situations. As another example, rapid tip-ins may create over-pressure situations due to a fuel injector pump working at an increased capacity (e.g., full capacity).

In one example, the issues described above may be addressed by a method comprising sending information from a vehicle to an off-board data analysis system central server in response to a fuel system pressure exceeding a threshold fuel system pressure and receiving processed data from the data analysis system identifying a set of operating conditions during which to display coaching instructions to the operator to reduce fuel system overpressure instances. The set of operating conditions may identify a combination of parameters, which when detected during subsequent vehicle operation concurrently occurring, one or more selected coaching conditions are displayed responsive thereto. The set of operating conditions may also provide a set of partial conditions, which when detected with other predetermined conditions, one or more selected coaching conditions are displayed responsive thereto. In this way, the operator may be notified and/or coached to reduce inputs, such as rapid tip-outs, only under those conditions where such tip-outs may cause fuel system over-pressure.

As one example, the fuel system pressure exceeding the threshold fuel system pressure increases a likelihood of the fuel system becoming degraded. Sending information includes wirelessly sending the information to the off-board data analysis system from a controller with computer-readable instructions for sending fault data of a vehicle to the off-board data analysis system in response to a fault, and comparing one or more engine conditions accompanying the fault of the vehicle to engine conditions of other vehicles experiencing the same fault. The method may further include monitoring a fuel tank fill-up and determining if the fuel tank fill-up quality is lower than a threshold quality (e.g., the fill-up is bad). If the fill-up is bad, then information regarding the fill-up is sent to the central server. The information may include a location of the fill-up. The central server may alert vehicle operators near the location requesting a fuel tank fill-up that the location has provided bad fuel and to fill-up elsewhere. The method may further include monitoring an engine start to determine engine start faults and results thereof. In this way, the method may mitigate and/or prevent future engine start faults by monitoring ambient and/or engine conditions promoting the faults and adjusting engine start conditions accordingly. The method will be described in greater detail below.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5A shows a sub-routine for monitoring fuel injections.

DETAILED DESCRIPTION

The following description relates to systems and methods for relaying vehicle conditions to a central server. Fueling faults and other system degradations are monitored and sent to the central server along with a plethora of accompanying conditions. The central server analyzes the data and compares it to data received from other similar vehicles (e.g., similar make, model, and/or mileage, etc.). The central server may alert the driver if the driver's behavior is degrading the vehicle, providing coaching tips to improve driving behavior. The central server may further alert the driver of system degradations and suggest to the driver to submit the vehicle to a maintenance shop.

Figure 1:
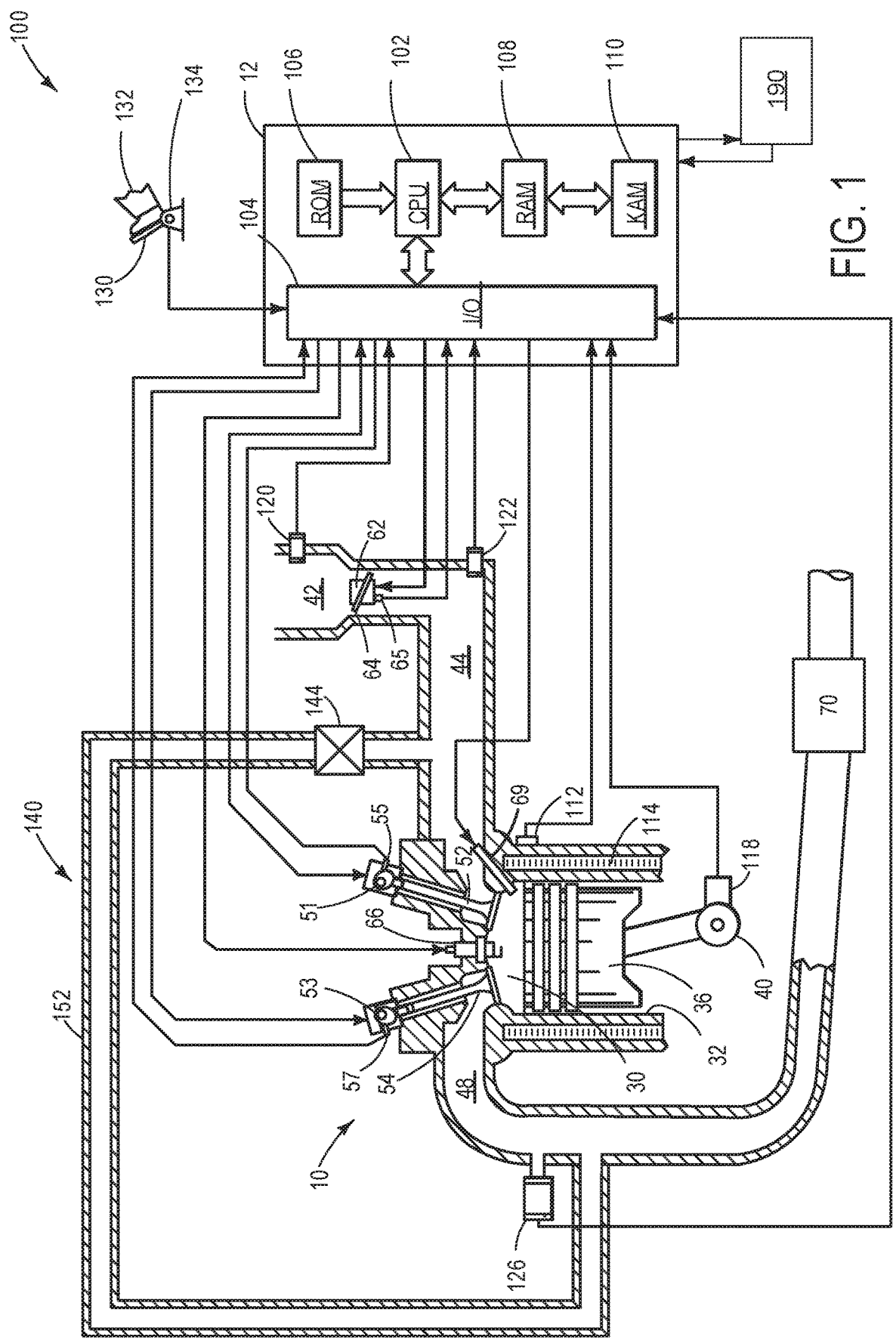
FIG. 1 shows a single cylinder of an engine.
Figure 2:
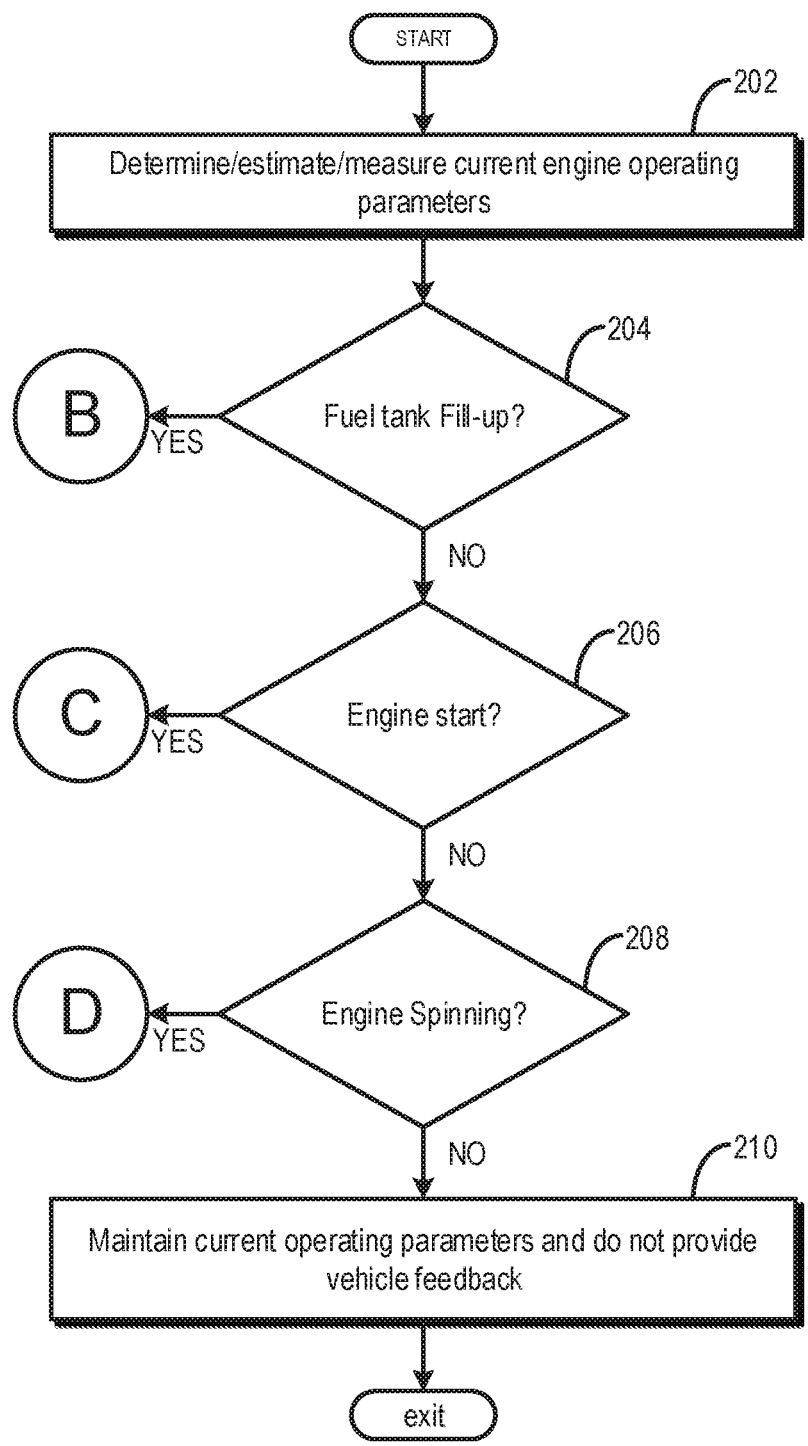
FIG. 2 shows a high-level flow chart.
Figure 3:
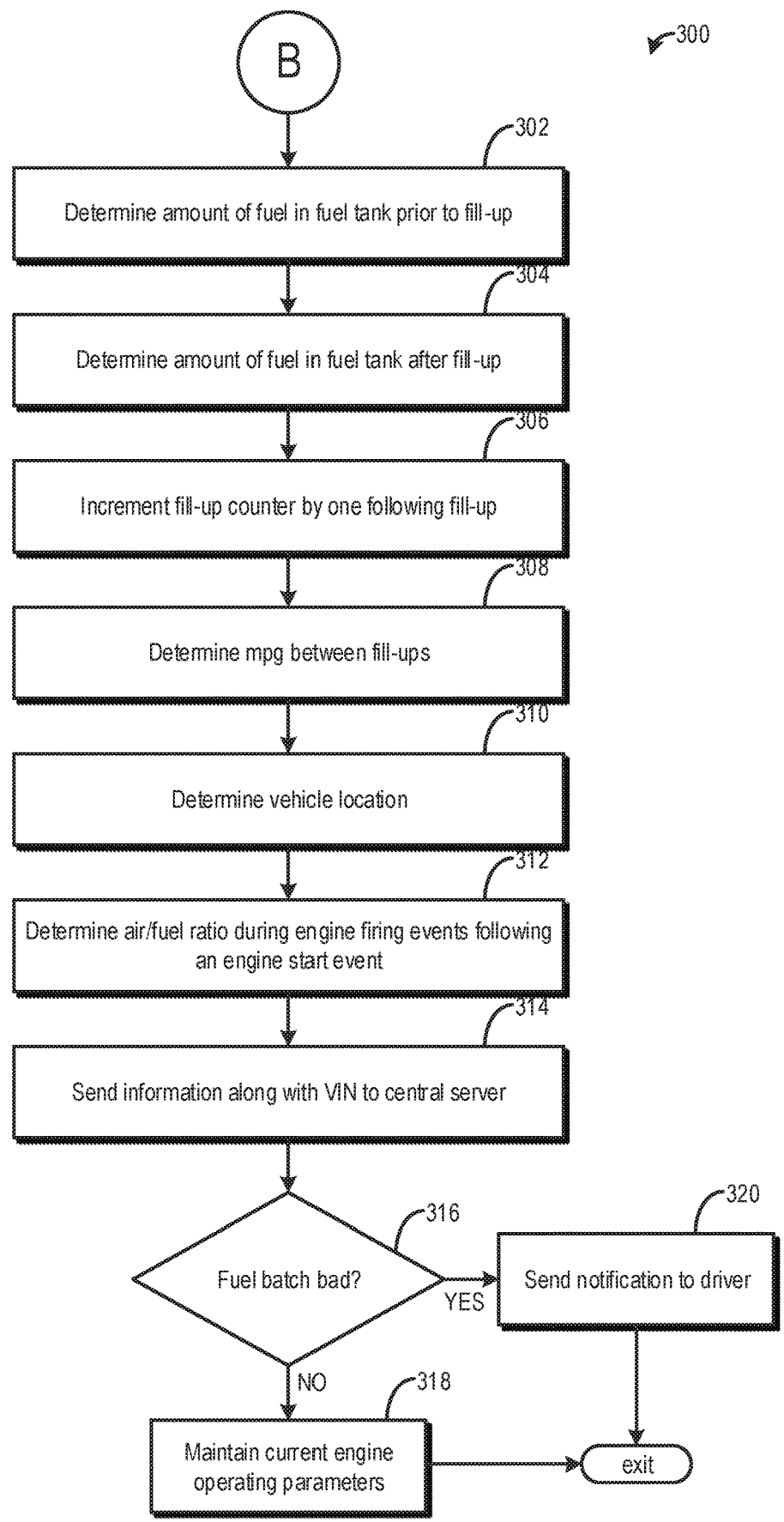
FIG. 3 shows a sub-routine for monitoring a fuel fill-up.
Figure 4:
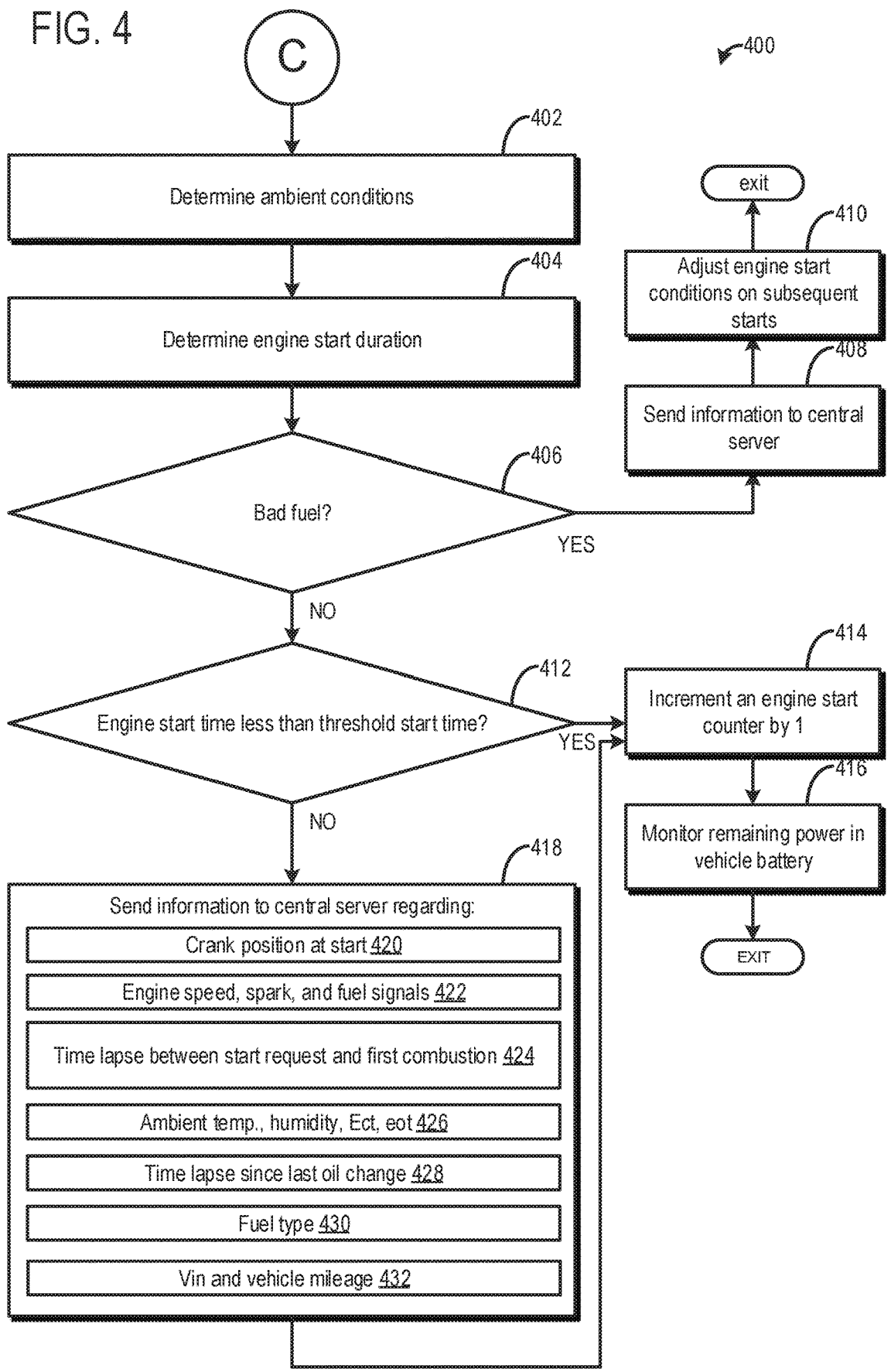
FIG. 4 shows a sub-routine for monitoring an engine start.
Figure 6:
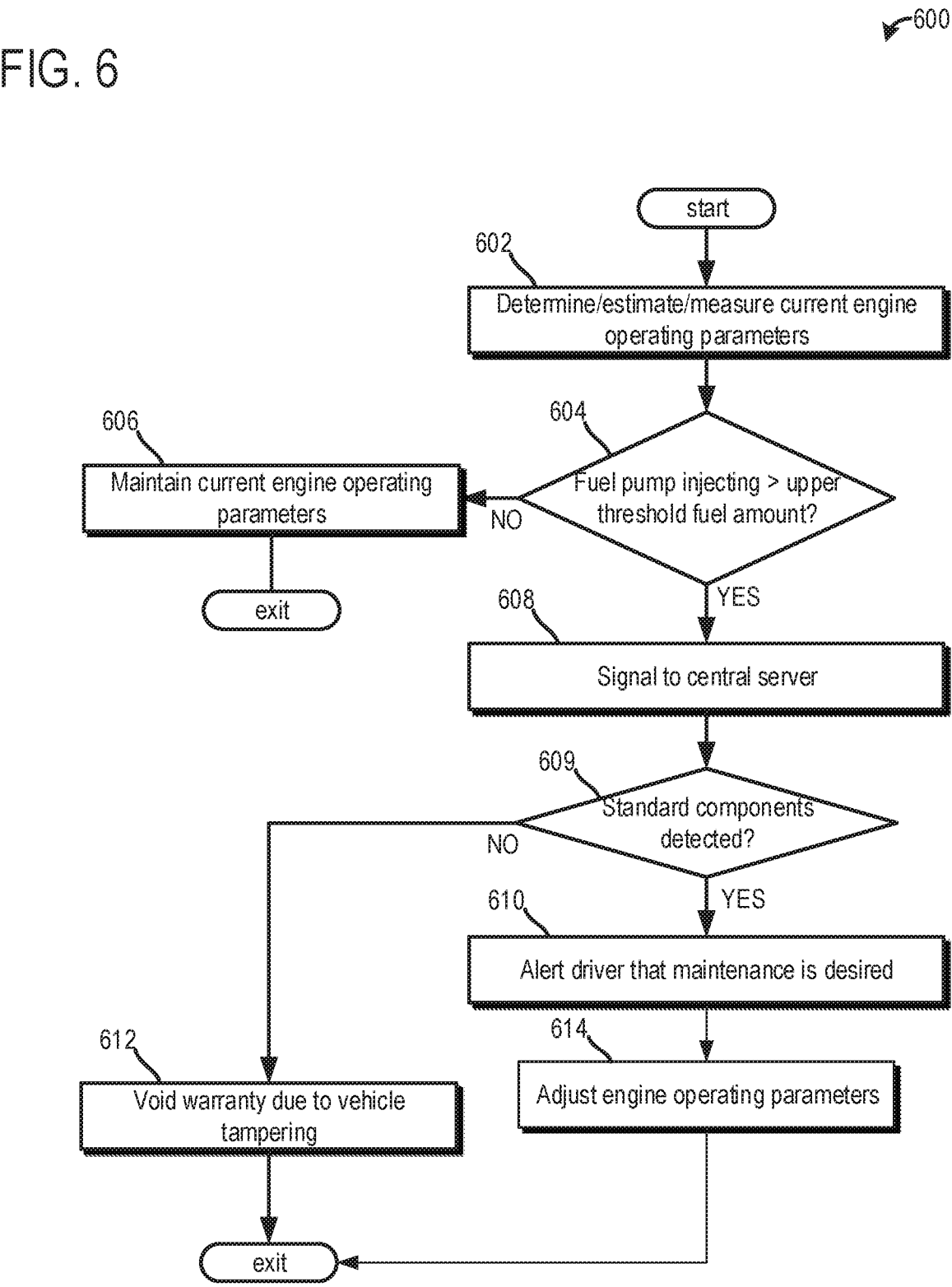
FIG. 6 shows a method for determining vehicle tampering.
Figure 7:
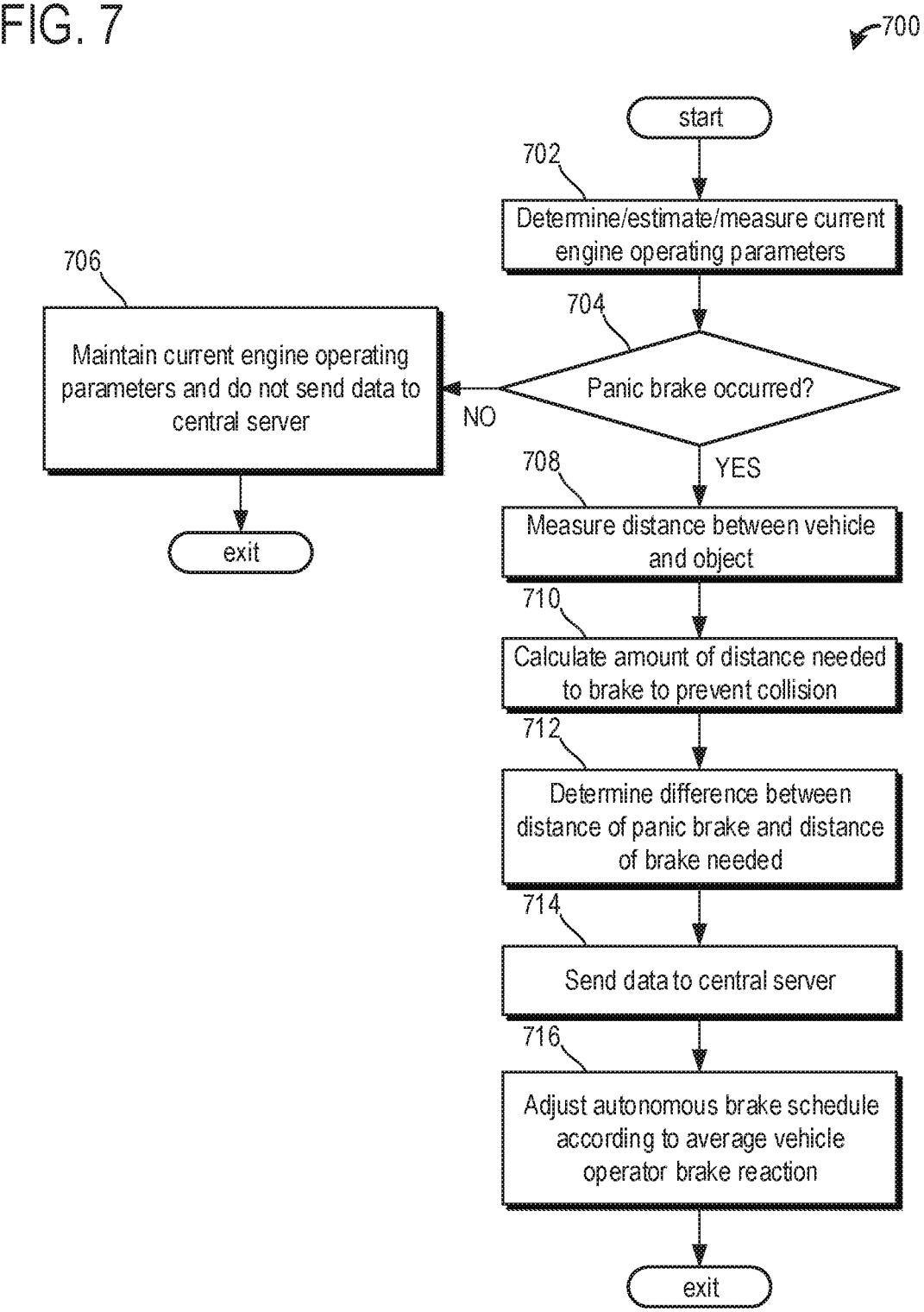
FIG. 7 shows a method for monitoring emergency braking.

The vehicle may comprise an engine with at least a cylinder having a plurality of sensors for monitoring engine conditions as shown in FIG. 1. A high-level flow chart depicting a routine for determining an engine operating conditions is shown in FIG. 2. A sub-routine for monitoring a fuel tank fill-up is shown in FIG. 3. A different sub-routine for monitoring an engine start is shown in FIG. 4. Another different sub-routine for monitoring engine conditions during engine spinning events is shown in FIGS. 5A, 5B, 5C, and 5D. A method for monitoring vehicle tampering is shown in FIG. 6. A method for monitoring panic braking and adjusting autonomous braking based on the panic braking is shown in FIG. 7.

Continuing to FIG. 1, a schematic diagram showing one cylinder of a multi-cylinder engine 10 in an engine system 100, which may be included in a propulsion system of a vehicle, is shown. The engine 10 may be controlled at least partially by a control system including a controller 12 and by input from a vehicle operator 132 via an input device 130. In this example, the input device 130 includes an accelerator pedal and a pedal position sensor 134 for generating a proportional pedal position signal. A combustion chamber 30 of the engine 10 may include a cylinder formed by cylinder walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 52 and exhaust valve 54. In some examples, the combustion chamber 30 may include two or more intake valves and/or two or more exhaust valves.

The engine 10 may be a turbocharged engine comprising a compressor mechanically coupled to a turbine. Alternatively, the engine 10 may be supercharged, wherein a compressor is powered by an electric machine (e.g., a battery). A blade of the turbine may spin as exhaust gas flows through the turbine, which in turn may drive the compressor. An engine power output may increase by compressing (e.g., increasing a density of) intake air flowing through the compressor to the engine. In some examples, a charge air cooler may be located between the compressor and the engine. The charge air cooler may cool the compressed intake air, which further increases the density of the charge air, thereby increasing a power output of the engine.

In this example, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and exhaust valve 54 may be determined by position sensors 55 and 57, respectively. In alternative examples, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

A fuel injector 69 is shown coupled directly to combustion chamber 30 for injecting fuel directly therein in proportion to the pulse width of a signal received from the controller 12. In this manner, the fuel injector 69 provides what is known as direct injection of fuel into the combustion chamber 30. The fuel injector may be mounted in the side of the combustion chamber or in the top of the combustion chamber, for example. Fuel may be delivered to the fuel injector 69 by a fuel system (not shown) including a fuel tank, a fuel pump, and a fuel rail. In some examples, the combustion chamber 30 may alternatively or additionally include a fuel injector arranged in the intake manifold 44 in a configuration that provides what is known as port injection of fuel into the intake port upstream of the combustion chamber 30.

Spark is provided to combustion chamber 30 via spark plug 66. The ignition system may further comprise an ignition coil (not shown) for increasing voltage supplied to spark plug 66. In other examples, such as a diesel, spark plug 66 may be omitted.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal. The intake passage 42 may include a mass air flow sensor 120 and a manifold air pressure sensor 122 for sensing an amount of air entering engine 10.

An exhaust gas sensor 126 is shown coupled to the exhaust passage 48 upstream of an emission control device 70 according to a direction of exhaust flow. The sensor 126 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 126 is a UEGO configured to provide output, such as a voltage signal, that is proportional to the amount of oxygen present in the exhaust. Controller 12 converts oxygen sensor output into exhaust gas air-fuel ratio via an oxygen sensor transfer function.

The emission control device 70 is shown arranged along the exhaust passage 48 downstream of the exhaust gas sensor 126. The device 70 may be a three way catalyst (TWC), $NO_x$ trap, diesel oxidation catalyst (DOC), selective catalytic reduction (SCR) device, particulate filter (PF), various other emission control devices, or combinations thereof. In some examples, during operation of the engine 10, the emission control device 70 may be periodically reset by operating at least one cylinder of the engine within a particular air-fuel ratio.

An exhaust gas recirculation (EGR) system 140 may route a desired portion of exhaust gas from the exhaust passage 48 to the intake manifold 44 via an EGR passage 152. The amount of EGR provided to the intake manifold 44 may be varied by the controller 12 via an EGR valve 144. Under some conditions, the EGR system 140 may be used to regulate the temperature of the air-fuel mixture within the combustion chamber, thus providing a method of controlling the timing of ignition during some combustion modes.

The controller 12 is shown as a microcomputer, including a microprocessor unit 102, input/output ports 104, an electronic storage medium for executable programs and calibration values shown as read only memory chip 106 (e.g., non-transitory memory) in this particular example, random access memory 108, keep alive memory 110, and a data bus. The controller 12 may receive various signals from sensors coupled to the engine 10, in addition to those signals previously discussed, including measurement of inducted mass air flow (MAF) from the mass air flow sensor 120; engine coolant temperature (ECT) from a temperature sensor 112 coupled to a cooling sleeve 114; an engine position signal from a Hall effect sensor 118 (or other type) sensing a position of crankshaft 40; throttle position from a throttle position sensor 65; and manifold absolute pressure (MAP) signal from the sensor 122. An engine speed signal may be generated by the controller 12 from crankshaft position sensor 118. Manifold pressure signal also provides an indication of vacuum, or pressure, in the intake manifold 44. Note that various combinations of the above sensors may be used, such as a MAF sensor without a MAP sensor, or vice versa. During engine operation, engine torque may be inferred from the output of MAP sensor 122 and engine speed. Further, this sensor, along with the detected engine speed, may be a basis for estimating charge (including air) inducted into the cylinder. In one example, the crankshaft position sensor 118, which is also used as an engine speed sensor, may produce a predetermined number of equally spaced pulses every revolution of the crankshaft.

The storage medium read-only memory 106 can be programmed with computer readable data representing non-transitory instructions executable by the processor 102 for performing the methods described below as well as other variants that are anticipated but not specifically listed.

The controller 12 is wirelessly (e.g., via internet) connected to a central server 190, where the controller 12 provides feedback based on information relayed to the controller 12 from the sensors described above (e.g., crankshaft position sensor 118, mass air flow sensor 120, temperature sensor 112, exhaust gas sensor 126, etc). In one example, the controller 12 provides fuel injection information to the central server 190 in response to a regeneration of the aftertreatment device 70. The fuel injection information may be determined based on a measurement of exhaust gas via exhaust gas sensor 126. Additionally, the fuel injection information may be estimated based on a commanded fuel injection volume sent to a fuel injector pump from the controller 12. The central server 190 may signal to the controller 12 to adjust one or more operating parameters in response to feedback information processed by the central server 190. As an example, the central server 190 signals to the controller 12 to adjust engine fueling during an engine start based on a battery state of charge. An engine start counter may be used to estimate the battery state of charge. In this way, the controller 12 and the central server 190 may communicate wirelessly to monitor engine conditions and/or faults and improve engine operation based on the feedback. Additionally or alternatively, the central server 190 may communicate with controllers of other vehicles. In this way, other vehicles may benefit from the above determined adjustments used to avoid faults without experiencing the faults themselves.

As will be appreciated by someone skilled in the art, the specific routines described below in the flowcharts may represent one or more of any number of processing strategies such as event driven, interrupt-driven, multi-tasking, multi-threading, and the like. As such, various acts or functions illustrated may be performed in the sequence illustrated, in parallel, or in some cases omitted. Like, the order of processing is not necessarily required to achieve the features and advantages, but is provided for ease of illustration and description. Although not explicitly illustrated, one or more of the illustrated acts or functions may be repeatedly performed depending on the particular strategy being used. Further, these Figures graphically represent code to be programmed into the computer readable storage medium in controller 12 to be carried out by the controller in combination with the engine hardware, as illustrated in FIG. 1.

FIG. 2 shows a high-level flow chart depicting a method 200 for monitoring a plurality of engine conditions and proceeding to a variety of sub-routines based on the monitored engine conditions. Instructions for carrying out method 200 and the sub-routines and other methods included herein may be executed by a controller (e.g., controller 12 of FIG. 1) based on instructions stored on a memory of the controller and in conjunction with signals received from sensors of the engine system, such as the sensors described above with reference to FIG. 1. The controller may employ engine actuators of the engine system to adjust engine operation, according to the methods described below.

Method 200 begins at 202, where the method 200 determines, estimates, and/or measures current engine operating parameters. Current engine operating parameters may include one or more of vehicle miles driven, fuel-tank fill level, fuel dilution, GPS location, ambient temperature, engine temperature, engine speed, vehicle speed, fuel system pressure, fueling errors, engine load, and air/fuel ratio. This list is not exhaustive and other operating parameters may be monitored at 202.

At 204, the method 200 includes determining if a fuel tank fill-up is occurring. The fuel tank fill-up may be occurring if the engine is off and a fuel tank sensor measures that fuel is flowing into the fuel tank. In some examples, if the engine is not off but the fuel tank sensor measures fuel entering the fuel tank, then a controller (e.g., controller 12 as shown in FIG. 1) may signal to turn-off the engine while simultaneously signaling to prevent fuel flow to the engine. During the fuel tank fill-up, new fuel is provided to the fuel tank from a source outside of the vehicle. If the fuel tank fill-up is occurring, then the method 200 proceeds to 302 of sub-routine 300, as described below in FIG. 3. If the fuel-tank fill-up is not occurring (e.g., fuel is not being delivered to the fuel tank from a fuel source outside of the vehicle), then the method 200 proceeds to 206.

At 206, the method 200 includes determining if an engine start is occurring. The engine-start may be occurring if an engine start demand has taken place, which includes an operator actuating a key or depressing a button. Alternatively, an engine start may be occurring if an engine speed is zero and begins to increase toward a target engine speed, as will be described below. Thus, an engine start may be occurring if the engine speed is between zero and the target engine idling speed responsive to a start request. If the engine-start is occurring, then the method 200 proceeds to 402 of sub-routine 400, as will be described below in FIG. 4. If the engine-start is not occurring (e.g., vehicle off or engine spinning), then the method 200 proceeds to 208.

At 208, the method 200 includes determining if the engine is spinning. The engine may be in idle or in an engine load greater than idle (e.g., low, mid, or high loads). If the engine is spinning, then the method 200 proceeds to 502 of sub-routine 500, as will be described below in FIG. 5A. If the engine is not spinning, then the method 200 proceeds to 210 to maintain current vehicle operating parameters. As such, the engine may be off and the fuel tank fill-up is not occurring. Additionally, no feedback may be provided to the central server at 210 since no operations and/or degradations are occurring.

Turning now to FIG. 3, it shows sub-routine 300 for monitoring the fuel tank fill-up. As described above, sub-routine 300 is initiated when the method 200 determines a fuel tank fill-up is occurring at 204 of FIG. 2.

In one example, the sub-routine 300 comprises determining a composition of fuel newly added to a fuel tank, storing a location where the new fuel was received and marking the location if the new fuel quality is lower than a threshold quality, sending the stored location to a central server, and receiving an alert from the central server of other locations where fuel quality is lower than the threshold quality, the other locations provided by other vehicles to the central server. The threshold quality may be substantially equal (e.g., ±5%) to manufacturer specifications. The alert is delivered via text, email, voice call, and in-vehicle messaging system. To avoid a fill-up with fuel lower than a threshold quality, the central server may alert a vehicle operator to refuel at a nearest fueling station providing fuel above the threshold quality if a distance between the nearest fueling station and a next fueling station, providing fuel above the threshold quality, is greater than a driving distance based on a current amount of fuel in the vehicle. The sub-routine 300 may further include adjusting engine operating parameters based on the new fuel quality being lower than the threshold quality. The adjusting may include decreasing EGR flow, increasing fuel injection pressure, advancing an injection timing, increasing an injection quantity, and decreasing an air/fuel ratio. The injection may include one or more of a primary (e.g., pilot) injection and a post-injection (e.g., injection following compression stroke and/or ignition). Marking the location may further include displaying a message to not refuel at a fueling location that previously provided fuel lower than the threshold quality.

Sub-routine 300 begins at 302, which includes determining an amount of fuel in the fuel tank prior to the fuel tank fill-up event. In one example, the amount of fuel may be determined as a percentage. The percentage may be calculated based on feedback from a volume (e.g., fuel level sensor) and/or mass sensor coupled to an interior of the fuel tank. Alternatively, the percentage may be estimated based on a number of miles driven since a previous fuel tank fill-up. In this way, the miles driven along with altitude changes, auxiliary components being activated (e.g., A/C active), drag and/or resistance, and other factors altering miles driven per gallon may be used to determine the percentage.

At 304, the sub-routine 300 determines an amount of fuel in the fuel tank following the fuel tank fill-up event. Additionally or alternatively, an amount of fuel added to the fuel tank may be determined by calculating a difference between the amount of fuel in the fuel tank after the fuel tank fill-up event and the amount of fuel in the fuel tank before the fuel tank fill-up event.

At 306, the sub-routine 300 increments a fill-up counter by one. As such, a total number of fill-ups may be tracked during a lifespan of the vehicle. Additionally or alternatively, the fill-up counter may measure a total amount of fuel added to the fuel tank. As such, a number of fill-ups and an amount of fuel added to the fuel tank may be measured during a lifespan of a vehicle.

At 308, the sub-routine 300 includes determining miles per gallon between fill-ups. This may be calculated by comparing a number of miles driven to an amount of fuel consumed since the previous fuel tank fill-up event and the current fuel tank fill-up event.

In one example, a current miles per gallon between fill-ups may be compared to a previous miles per gallon between fill-ups. Alternatively, the current miles per gallon between fill-ups may be compared to an average of all the previous miles per gallon between fill-ups. On the other hand, the current miles per gallon between fill-ups may be compared to an estimated miles per gallon tracked by an odometer. If the current miles per gallon between fill-ups is a threshold difference less than the average or the previous miles per gallon between fill-ups, then a controller (e.g., controller 12 of FIG. 1) may inform a central server. Additionally or alternatively, the central server may be informed of a miles per gallon decrease in response to the current miles per gallon being less than the average or previous miles per gallon for a threshold number of successive times. For example, if the current miles per gallon is less than the average or previous miles per gallon after three consecutive fill-up events, then the central database may be notified of the decrease in miles per gallon. The central server may signal to the controller to inform the vehicle owner via a prompt on a vehicle infotainment system that the vehicle is driving fewer miles per gallon than expected and that vehicle servicing may be desired. Additionally or alternatively, the central server may signal to the controller to adjust engine operating conditions in response to the degradation. In one example, adjusting engine operating conditions includes the controller signaling to reduce cabin cooling by adjusting actuators of an air/conditioning unit and/or fan to flow less air into a vehicle cabin.

In some examples, additionally or alternatively, fuel economy for ethanol or biodiesel content, which could be obtained either from estimations based on the exhaust sensor and/or in-cylinder pressure sensor (ICPS) or from information provided from the fuel pump may be used to adjust miles per gallon between fill-ups. In this way, the current miles per gallon may be adjusted to account for ethanol and/or biodiesel in the fuel. As one example, the adjusting includes increase the current miles per gallon as the ethanol and/or biodiesel content in the fuel increases. Fuel economy may further be adjusted by accounting for fuel quality, where fuel quality may include an octane rating, water content, concentration contaminants, etc.

At 310, the sub-routine 300 includes determining a location of the vehicle. This may further include determining an address of a fuel station at which the vehicle received fuel from the current fuel tank fill-up. The location may be determined via GPS, phone, navigation system, etc. In one example, the phone may be wirelessly connected (e.g., Bluetooth) to the vehicle. As such, the vehicle may request a current location from the phone without a user input and/or action.

At 312, the sub-routine 300 determines an air/fuel ratio during engine firing events following an engine start event. Events outside the engine start event include engine firings occurring after a target engine speed is reached and a successful cylinder combustion occurred. The air/fuel ratio may be determined by an exhaust gas sensor in an exhaust passage fluidly coupled to an engine. In some examples, the air/fuel ratio may be based on a fuel quality of the fuel injection determined by the ICPS. As such, the air/fuel ratio may decrease (e.g., more rich) as an octane rating of the injected fuel increases.

At 314, the sub-routine 300 includes sending the information gathered above along with a vehicle identification number (VIN) to the central server (e.g., central server 190 shown in FIG. 1). The central server may store, analyze, and process the data. In one example, this may include comparing the data received from the vehicle to data received from other similar vehicles (e.g., model, age, mileage, location, usage, etc.). Furthermore, the data may be compared to similar vehicles in similar conditions (e.g., cold-weather, altitude, rain, etc.). As an example, a vehicle in Portland, Oreg. may be compared to a vehicle in Detroit, Mich. if weather and other external conditions (e.g., altitude) are similar.

At 316, the sub-routine 300 includes determining if the fuel batch from the current fuel tank fill-up is bad. The fuel may be bad if it does not meet vehicle specifications (e.g., too dilute, too rich, etc.) Additionally or alternatively, the fuel batch may be bad if it is the wrong type of fuel (e.g., diesel in a spark ignited vehicle). The fuel composition may be measured by a fuel composition sensor which may detect amounts of different constituents in the fuel. As an example, the controller may determine if the newly added fuel batch is bad by comparing a composition of the fuel in the fuel tank prior to and after the fuel tank fill-up to a threshold fuel composition. Alternatively, the fuel sensor may be located in a portion of the fuel tank such that it may measure a composition of incoming fuel prior to it combining with fuel already in the fuel tank. As such, the fuel sensor may directly determine if the incoming fuel is lower than the threshold quality (herein referred to as bad fuel). Additionally or alternatively, a composition of the fuel batch from the current fuel tank fill-up may be determined via an in-cylinder pressure sensor (ICPS), indicated mean effective pressure (IMEP), combustion phasing, peak pressure rise rate, peak pressure location, peak pressure rise location, and/or other suitable means.

If the fuel composition, of fuel entering the fuel tank or of fuel in the fuel tank after fill-up, is substantially similar (e.g., within 95%) to the threshold fuel composition, then the sub-routine 300 proceeds to maintain current engine operating parameters and does not send a notification to the driver at 318.

If the fuel composition is not equal to the threshold fuel composition, then the sub-routine 300 proceeds to send a notification to the driver at 320. This may include the controller sending a message to the driver via text, email, phone call, and/or an updated display on a vehicle infotainment system. The method may further include memorizing the locations in which the vehicle received bad fuel. In one example, where a driver is operating the vehicle and requests a navigation system to locate one or more gas stations for a fuel tank fill-up, the controller may flag locations where the vehicle has received bad fuel. Alternatively, the controller may not display these locations in response to the request to locate gas stations. In some examples, the central server may notify other vehicles when within a threshold range (e.g., 50 miles) of locations providing bad fuel. In this way, a vehicle operator may avoid fueling stations with bad fuel. Additionally or alternatively, the sub-routine 300 may further include determining if the fuel composition deviation from a desired fuel composition may degrade the engine. If the bad fuel batch is capable of degrading the engine, then the sub-routine 300 may include adjusting engine operations, where the adjusting may include applying derates, limit torque, providing driving coaching tips, signal for help, provide a list of contacts (e.g., towing company, cab, etc.).

In some examples, if the fuel station is in a remote location and the vehicle is demanding fuel due to a volume of fuel in the fuel tank being low, then the controller may alert the driver of the bad fuel along with a distance between the fuel station and a nearest fuel station on a designated travel path. For example, a driver may input a destination into a navigation system. While driving, the vehicle may deplete the fuel in the fuel tank, and thus, demand fuel. The vehicle operator may approach a fuel station known to the central server to provide bad fuel. In one example, the central server may signal to the controller to display and/or send an alert to the vehicle operator (e.g., indicating "Fuel station is bad. Consider filling fuel tank at a different location.") notifying them of the bad fuel along with a list of other fueling station nearest to a current location and deviating the least from a current travel path. As another example, the controller may predict when the fuel tank will demand fuel and notify the vehicle operator to perform a fuel tank fill-up prior to the demand to avoid filling at a fuel station providing bad fuel. In this way, the vehicle operator is near a fuel station providing acceptable fuel and does not have sufficient fuel to drive to the next nearest fuel station providing acceptable fuel. As such, the controller may avoid bad fueling stations by measuring a mileage remaining, based on fuel in the fuel tank, and from information regarding fuel quality at fuel stations from the central server.

Turning now to FIG. 4, it shows sub-routine 400 for monitoring an engine start. As described above, sub-routine 400 is initiated when the method 200 determines an engine start is occurring at 206 of FIG. 2. At 402, the sub-routine 400 includes determining ambient conditions. Ambient conditions may be determined via one or more of a weather feature of the navigation system, a temperature sensor, a humidity sensor, a pressure sensor, and other sensors suitable for determining ambient conditions.

At 404, the sub-routine 400 includes determining an engine start duration. The engine start duration may be a period of time from when an engine start is activated (e.g., ignition key turned or button depressed) to when the engine reaches a target engine speed, where the target engine speed may be substantially equal to an engine speed at idle. Additionally or alternatively, the start duration may be measured from a start request to a first combustion. In some embodiments, additionally or alternatively, the engine start duration may be measured via an ICPS.

At 406, the sub-routine 400 proceeds to determine if bad fuel is present in the fuel tank. 406 of sub-routine 400 is substantially similar to 316 of sub-routine 300. As such, if the fuel is bad, then the sub-routine 400 proceeds to send information to the central server at 408. The information may include that bad fuel is present in the fuel tank for the engine start and the information may deviate from engine starts with acceptable fuel. At 410, the sub-routine 400 includes adjusting engine operating conditions. As an example, the central server may signal to the controller to determine an amount of bad fuel left in the fuel tank, estimate an amount of miles the vehicle may drive on the bad fuel, and to adjust future engine starts and engine operating conditions for a duration that the fuel tank comprises bad fuel. As another example, the controller may signal an actuator of a fuel injector to inject more fuel during engine starts with bad fuel compared to engine starts with acceptable (e.g., good) fuel.

If bad fuel is not present at 406, then the sub-routine 400 proceeds to determine if the engine start duration is less than a threshold start duration at 412. The threshold start duration may be a dynamic threshold partially dependent on ambient conditions. As an example, the threshold start duration may have a fixed value of five seconds, wherein different ambient conditions may add or subtract to the fixed value to generate the threshold start duration. Cold ambient conditions, humidity, wind, altitude, etc. may add to the fixed value. Hot ambient conditions, low altitude, dry conditions, etc. may subtract from the fixed value. In this way, ambient conditions negatively impacting engine starts may increase the threshold start duration, whereas ambient conditions positively impacting engine start may decrease the threshold start duration.

If the engine start duration is less than the threshold start duration, then the engine has achieved its first combustion and reached the target engine speed within the threshold start duration (e.g., 5 seconds). In some examples where the vehicle is a hybrid vehicle and the engine start duration is less than the threshold start duration, then the engine has also met a driver torque demand along with meeting the target engine speed and achieving a first combustion.

At 414, the sub-routine 400 includes incrementing an engine start counter by one. The counter may tally a total number of completed engine starts.

At 416, the sub-routine 400 includes monitoring and/or estimating a state of charge of a vehicle battery. This may include decreasing an estimate of the state of charge in proportion to a length of the engine start duration. That is to say, a longer engine start duration may decrease the estimate of the state of charge more than a shorter engine start duration.

Additionally or alternatively, the central server may provide information predicting a condition of vehicle components based on information from other, similar vehicle regarding engine starts counts and vehicle maintenance. For example, if the counter reaches a count (e.g., 1000) where a significant number of other vehicles have experienced component degradation (e.g., fuel injector degraded), then the central server may signal to the controller to alert the vehicle operator to seek routine maintenance to ensure at risk components are not degraded.

If the engine start duration is greater than the threshold start duration, then the engine failed to complete one or more of a first combustion, reaching the target engine speed, and meeting the driver torque demand within the threshold start duration, and the sub-routine 400 proceeds to 418. In one example, the vehicle may achieve a first combustion without reaching the target engine speed within the threshold start duration.

At 418, the sub-routine 400 includes sending information to the central server regarding a crank position at start at 420, engine speed, spark, and fuel signals at 422, time lapse between start request and first combustion at 424, ambient temperature, humidity, engine coolant temperature (ECT), and engine oil temperature (EOT) at 426, time lapse since a last oil change at 428, fuel type at 430, and VIN and vehicle mileage at 432.

The central server may analyze the information received and compare the parameters of the current failed engine start to parameters of previous failed engine starts. If one parameter is continuously below a threshold level, then the central server may signal to the controller to alert the driver that maintenance is demanded. For example, if an engine coolant temperature (ECT) is less than a threshold coolant temperature at the engine start, then the controller may adjust one or more engine operating parameters during engine start to compensate for the ECT not warming up properly. As an example, the controller may adjust engine actuators to direct a greater amount of engine coolant toward a heat exchanger before flowing the coolant to the engine compared to coolant flow in previous engine starts. The controller may also alert the driver that maintenance of the engine coolant system is desired.

Following sending information to the central server, the sub-routine 400 proceeds to increment the engine start counter by one (similar to 414 described above). The sub-routine 400 then proceeds to monitor and/or estimate a state of charge of the vehicle battery (similar to 416). In one example, the estimate of the state of charge of the vehicle battery following a failed engine start (e.g., engine start time greater than the threshold start time) may result in a greater estimated decrease of the state of charge compared to a successful engine start (e.g., engine start time less than the threshold start time). Thus, more battery life is consumed during a failed engine start than a successful engine start in some examples.

In one example, if the battery state of charge decreases to a state of charge less than a threshold state of charge, the controller may prompt the infotainment system to display a message to the vehicle operator that replacement of the battery is desired. Alternatively, email, text, voice call, and other methods of communication may be used to alert the vehicle operator of the degraded battery. Additionally, the controller may adjust future engine operating parameters to prolong a life of the battery (e.g., limit air conditioning, limit engine load, etc.).

In some examples, a sub-routine may comprise comparing a fuel system pressure to a threshold fuel system pressure and displaying tailored coaching tips to a vehicle operator in response to the comparison. The comparison may include an instance where the fuel system pressure to the threshold fuel system pressure and where a counter counts the number of instances. The counting is further adjusted based on a duration of time the fuel system pressure exceeds the threshold fuel system pressure, and where the count is increased more when the duration of time increases. The sub-routine may further comprise timing the comparison when the fuel system pressure exceeds the threshold fuel system pressure, and sending information to a central server based on vehicle operator inputs increasing a duration of the fuel system pressure exceeding the threshold fuel system pressure. The displaying tailored coaching tips to the vehicle operator may include displaying the coaching tips on an in-vehicle messaging system when a number of instances exceeds a threshold count. The coaching tips are tailored based on the comparison during a tip-out or a tip-in. Coaching tips in response to the comparison during the tip-out include instructing a vehicle operator to tip-out more slowly. Coaching tips in response to the comparison during the tip-in include instructing a vehicle operator to tip-in more slowly. Turning now to FIG. 5A, it shows sub-routine 500 for monitoring a fuel injection and/or fuel system. As described above, sub-routine 500 is initiated when the method 200 determines that an engine is spinning (e.g., engine start is completed) at 208 of FIG. 2.

At 502, the sub-routine 500 includes monitoring cylinder fueling, which may be conducted based on feedback from an ICPS. This may further include monitoring primary fuel injections, post-combustion fuel injections, fuel injection pressure, fuel injection timing, fuel dispersion, in-cylinder mixing, and fuel impingement onto cylinder walls. In some examples, additionally or alternatively, the monitoring cylinder fueling may include data from a commanded fuel injection, as described above.

At 504, the sub-routine 500 includes determining if a fuel injection amount is less than a demanded amount. The fuel injection amount may be estimated based on an air/fuel ratio. Additionally or alternatively, the fuel injection amount may be estimated based on an in-cylinder pressure, in-cylinder temperature, in-cylinder hydrocarbon sensor, ICPS, IMEP, injector sensor, and other suitable means for determining a fuel injection amount. If the fuel injection amount is less than the demanded amount, then the sub-routine 500 proceeds to 512 of FIG. 5B described below.

If the fuel injection amount is not less than the demanded amount, then the sub-routine 500 proceeds to 506 to determine if a fuel system pressure is greater than a threshold pressure. The fuel system pressure may be determined based on feedback provided from a pressure sensor in the fuel system to the controller. In some examples, additionally or alternatively, the fuel system pressure may be estimated by the ICPS, where the fuel system pressure is estimated based on an in-cylinder pressure, which may increase as an injection pressure increases. The injection pressure is proportional to the fuel system pressure, in one example. If the fuel system pressure is greater than a threshold fuel system pressure, then the sub-routine 500 proceeds to 538 of FIG. 5C.

If the fuel system pressure is not greater than the threshold pressure, then the sub-routine 500 proceeds to determine if a PF regeneration post-injection is occurring at 508. PF regeneration post-injection may be occurring if an amount of fuel injected into the cylinder is greater than a demanded amount of fuel. This may include a secondary injection after the primary injection. If the PF regeneration post-injection is occurring, then the sub-routine 500 proceeds to 548 of FIG. 5D. If the PF regeneration post-injection is not occurring, then the sub-routine 500 proceeds to 510 to maintain current engine operating parameters and continue to monitor fueling conditions.

Figure 5B:
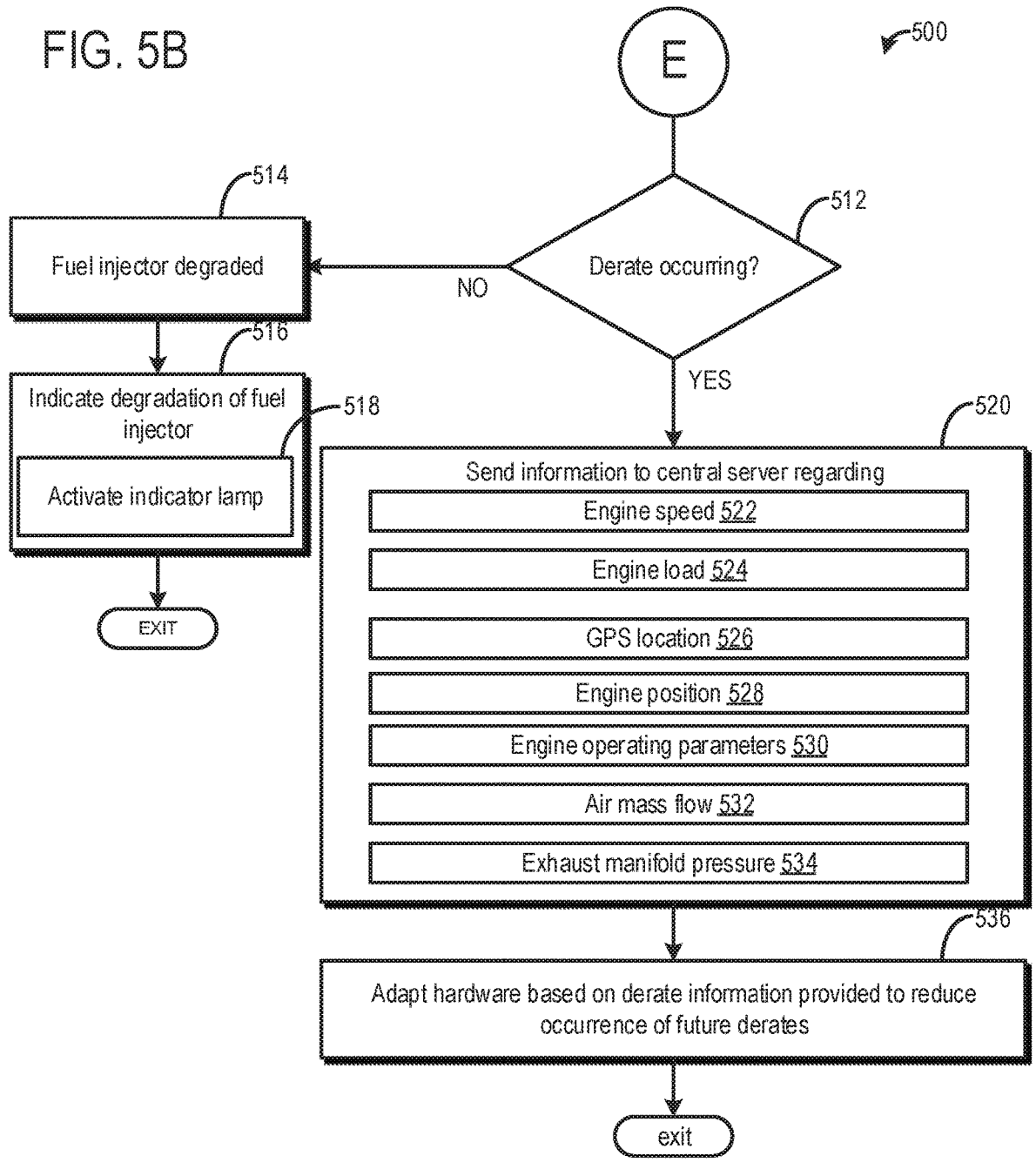
FIG. 5B shows a method for adjusting engine operating parameters in response to a derate.

Turning now to FIG. 5B, it includes a portion of sub-routine 500 for monitoring engine derates. Sub-routine 500 proceeds to 512 after determining, at 504 of FIG. 5A, a fuel injection is less than the demanded injection. At 512, the sub-routine 500 includes determining if a derate is occurring. The derate may be a self-imposed (e.g., automatic) fueling limitation generated by the vehicle engine control system functioning to protect one or more engine components. As an example, the controller signals an actuator of the fuel injector to inject less fuel than is demanded, thereby, reducing a power output of the engine, even if the operator and/or other engine torque requester are requesting greater fuel injection for increased power output. When fuel demands are lower than the maximum allowed by the derating operation, then no further modifications to the control signals are imposed by the controller (e.g., a derate may not be applied). In one example, the derate may be in response to a coolant temperature being greater than an upper threshold coolant temperature. In this way, the derate may prevent overheating of the coolant, which in turn may prevent degradation of one or more engine components.

If a derate is not occurring, then the sub-routine 500 proceeds to 514 where the fuel injector is determined to be degraded. In one example, the fuel injector may be plugged (e.g., clogged) or the actuator of the fuel injector may be degraded such that it cannot draw the commanded amount of fuel. At 516, the sub-routine 500 proceeds to indicate a degradation of the injection, which may include turning on an indicator lamp at 518. The indication may further include a text message, email, phone call, and/or alert displayed onto the infotainment system. The indication may alert a vehicle operator to seek vehicle maintenance (e.g., indicating "Fuel injector degraded. Maintenance desired."). The indication may further display that one or more fuel injectors are degraded.

As an example, the controller may adjust fuel injector operations based on the degradation. As such, the controller may signal an actuator of the fuel injector to inject an amount of fuel greater than the demanded amount of fuel during future fuel injections. In this way, the degradation, which includes the fuel injector injecting less than the demanded amount of fuel, may be corrected by injecting a greater amount of fuel than the demanded amount.

If a derate is occurring, then the sub-routine proceeds to 520 to send information to the central server regarding engine speed at 522, engine load at 524, GPS location at 526, engine position (e.g., crank position, crank speed, etc.) at 528, engine operating parameters at 530, air mass flow at 532, and exhaust manifold pressure at 534.

The central server may analyze the information received to determine which circumstances promote derates. The central server may inform the controller of the determined circumstances promoting derates so that the controller may adjust engine operating parameters during future operations including those circumstances to limit the occurrence of derates, as an example.

At 536, the sub-routine 500 includes adapting hardware based on derate information provided to reduce occurrence of future derates.

For example, derates may occur when an ambient temperature is high (e.g., greater than or equal to 100° F. (37° C.)) and an engine load is high to prevent and/or mitigate an overheating of engine components and/or engine coolant. However, the controller may determine a likelihood of degradation during high ambient temperatures and high engine load and override the derate (e.g., prevent the derate from occurring and inject the demanded amount of fuel) if the likelihood of degradation is less than a threshold likelihood (e.g., less than 1%). In this way, a driver demand may be met while a degradation likely does not occur in undesired circumstances. This can be done intelligently based on information from the field for many similar vehicles have the same engine configuration and a similar drive profile (e.g., average engine speed, average distance of each trip, geographic location, etc.).

As an example, there may be certain limits that can only be exceeded for a limited period of time over the vehicle life without creating durability issues (e.g. 50 hours at extremely high fuel injection pressure). A vehicle operator could be informed via in-vehicle communication (e.g., alert on the infotainment system) that it may be possible to avoid a derate for a limited period of time. If the driver choses to do so, the engine could operate over normal limits to avoid or mitigate the derate time. The controller may track the time under which the vehicle has operated in that way and send the accumulated time with the VIN to the central server. If they chose not to operate this way when prompted, the derate would be invoked. When the maximum total number of hours under extreme conditions is reached, the derate would be invoked and the driver/owner could be informed that such operation is not possible again unless certain components are replaced.

Figure 5C:
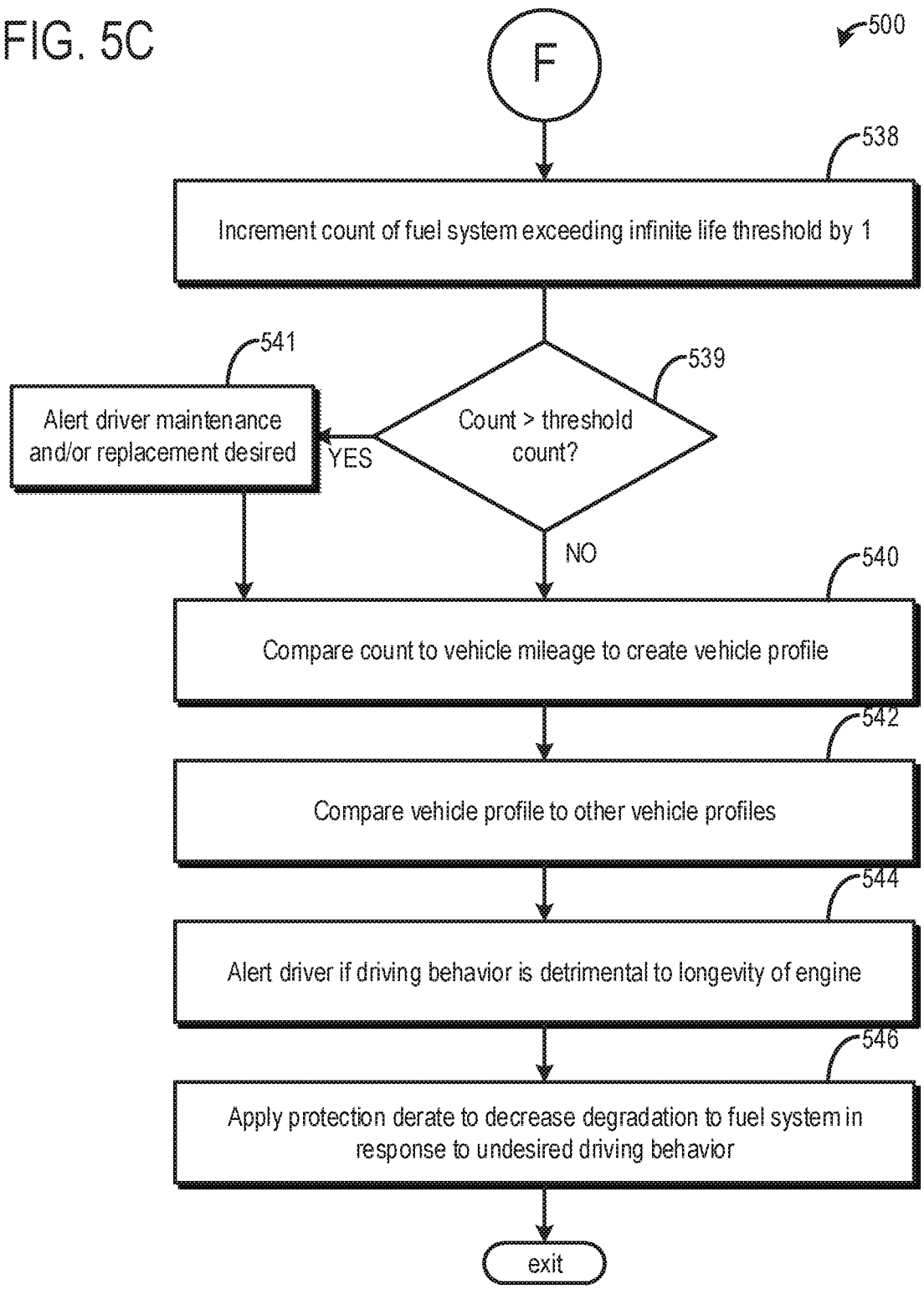
FIG. 5C shows a method for adjusting engine operating parameters in response to a fuel system pressure.

Turning now to FIG. 5C, it shows a portion of sub-routine 500 for monitoring a fuel system pressure. Sub-routine 500 proceeds to increment a count of the fuel system exceeding a threshold fuel system pressure by one at 538 after determining a fuel system pressure is greater than the threshold fuel system pressure at 506 of FIG. 5A. The threshold fuel system pressure may be a fixed number based on a pressure capable of degrading the fuel system. If a fuel system pressure does not exceed the threshold fuel system pressure, then a likelihood of the fuel system degrading is relatively low or substantially zero. However, if the fuel system pressure exceeds the threshold fuel system pressure, a longevity of the fuel system may be compromised or a likelihood of degrading the fuel system may increase and/or be relatively high.

As an example, as the count increases (e.g., a number of instances where the fuel system pressure has exceeded the infinite life threshold), the likelihood of degradation may proportionally increase as the count increases. As such, the likelihood for the fuel system to degrade is greater when the count is 10 compared to when the count is less than 10 (e.g., five). In some examples, additionally or alternatively, the count may be adjusted based on an amount of time the fuel system exceeds the threshold fuel system pressure. For example, a first instance where the fuel system is greater than the infinite life threshold for one minute increases the count more than a second instance where the fuel system is greater than the infinite life threshold for five seconds. In this way, the sub-routine may account for a greater likelihood of fuel system degradation by adjusting the count based on an amount of time the fuel system exceeds the threshold fuel system pressure. Additionally or alternatively, a magnitude of the fuel system pressure exceeding the infinite life threshold such that a greater magnitude may result in increasing the count more than a lesser magnitude. For example, if a third instance includes the fuel system exceeding the infinite life threshold by 20 Pascals and a fourth instance includes the fuel system exceeding the infinite life threshold by 100 Pascals, then the fourth instance increases the count five times more than the third instance.

At 539, the sub-routine 500 includes determining if the count is greater than a threshold count, where the threshold count is based on a count corresponding to maintenance and/or replacement of the fuel system being desired. If the count is greater than the threshold count, then the sub-routine 500 proceeds to 541 to alert the driver that maintenance and/or replacement is desired. The alert may be via text message, email, in-vehicle messaging system (e.g., display on an infotainment system), and/or a phone call. Following 541 the sub-routine 500 may proceed to 540. Similarly, if the count is less than the threshold count, the sub-routine 500 may proceed to 540.

At 540, the sub-routine 500 compares the count to the vehicle mileage to create a vehicle profile. The vehicle profile is sent to the central server, where the vehicle profile is compared to other vehicle profiles at 542. The vehicle profiles may include repair and/or warranty data. This may allow the central server to predict and/or determine which vehicle profiles may desire future repairs.

At 544, the sub-routine 500 alerts the driver if their driving behavior is detrimental to a life of the vehicle. The operator's driving behavior may be compared to other similar vehicles in a similar region to determine if the vehicle operator's driving behavior is the cause of the high fuel system pressures. If the two driving behaviors are disparate, with a first driving behavior leading to fuel system pressures being greater than the infinite life threshold and the other not, then the operator's driving behavior may be detrimental to the life of the vehicle.

At 546, the sub-routine 500 applies a protection derate to decrease the likelihood of degradation to the fuel system in response to undesired driving behaviors causing the fuel system pressure to exceed the infinite life threshold. In one example, the derate may be applied to during lower fuel injection pressure and lower fuel quantity engine conditions, during a tip-in, until the controller adjusts to avoid overshooting a commanded fuel injection.

In one example, the central server analyzes the data and may determine that the fuel system pressure is exceeding the threshold fuel system pressure due to driver behavior. The central server may alert the controller and provide the controller with a coaching tips for improving the driver's driving behavior. For example, a fuel system pressure may exceed the threshold fuel system pressure during a rapid tip-out following a tip-in due to the fuel system pressure not decreasing as rapidly as in-cylinder pressure. In this way, the fuel injector may continue to deliver fuel to the cylinder after the cylinder no longer demands fuel. The fuel system pressure may exceed the threshold fuel system pressure as the controller adjusts to the new commanded fuel injection conditions. As such, the controller may provide prompts to assist a driver in learning to tip-out more slowly, at least during particular operating conditions meeting specific criteria as disclosed herein. It will be appreciated that other driving behaviors may lead to fuel system pressures being greater than the threshold fuel system pressure. For example, an aggressive tip-in from a low engine load may result in high fuel system pressure spikes as the fuel system pressure rapidly increase from a low pressure to a high pressure. Additionally or alternatively, the driving behavior tips may be catered to current engine operating parameters that coincide with fuel system pressures exceeding the threshold fuel system pressure. For example, driving tips during a cold-start may be different than driving tips during a high engine load in high ambient temperatures, with no tip-out coaching during cold starts but providing tip-out coaching (e.g., indicating "please release the pedal more slowly under driving situations like the present ones") in response to warmed-up engine conditions and engine load less than a threshold). As such, the coaching tips may be dependent on engine operating conditions and ambient conditions.

As another example, in response to the fuel system pressure exceeding the threshold fuel system pressure, the controller may present coaching tips to increase engine life (e.g., indicating "depress pedal part-way and hold for several seconds before depressing further"). The coaching tips in response to the aggressive tip-in may further include presenting optional controls to aid the driver (e.g., indicating "would you like to controller to automatically manage acceleration to avoid operation that will limit the life of the engine?"). If the driver selects yes, then the controller may automatically adjust tip-ins to mitigate and/or prevent fuel system pressures exceeding the threshold fuel system pressure. However, the controller may further monitor if an emergency and/or panic tip-in is occurring based on monitoring driver behavior (e.g., tip-in more aggressive than previous tip-ins), vehicle surroundings (e.g., vehicle cameras sensing nearby objects and/or possible collisions), and other tactics for identifying emergency and/or panic tip-in. If the tip-in is an emergency and/or panic tip-in, then the coaching tip may not be automatically applied and the tip-in is not adjusted. Following the emergency and/or panic tip-in, the controller may notify the driver of such behavior and alert the driver that depressing the pedal more slowly may prolong an engine longevity (e.g., indicating "rate of pedal change indicated an emergency tip-in and that depressing the pedal more slowly may increase an engine longevity").

Further, the central server may identify situations in which to provide coaching to reduce tip-out rate and situations in which there is no desire to coach the operator (e.g., because rapid tip-outs are acceptable). Such situations may include a set of operating parameters provided to the vehicle, such as fuel temperature, engine temperature, engine load ranges, etc. Some examples where coaching tips may not be prompted may include a tip-in during an engine load above a threshold upper load (e.g., a high load), a tip-out during an engine load less than a threshold lower load (e.g., a low load), and during conditions where a fuel system pressure reacts quickly to changes in demanded cylinder fueling.

Still further, the coaching tips may be tailored based on driver behaviors contributing to fuel system pressures exceeding the infinite life threshold. For example, a driver aggressively tipping-in may receive different coaching tips than a driver tipping-out too quickly. Additionally or alternatively, emergency and/or panic tip-ins may receive different coaching tips than the driver aggressively tipping-in.

Figure 5D:
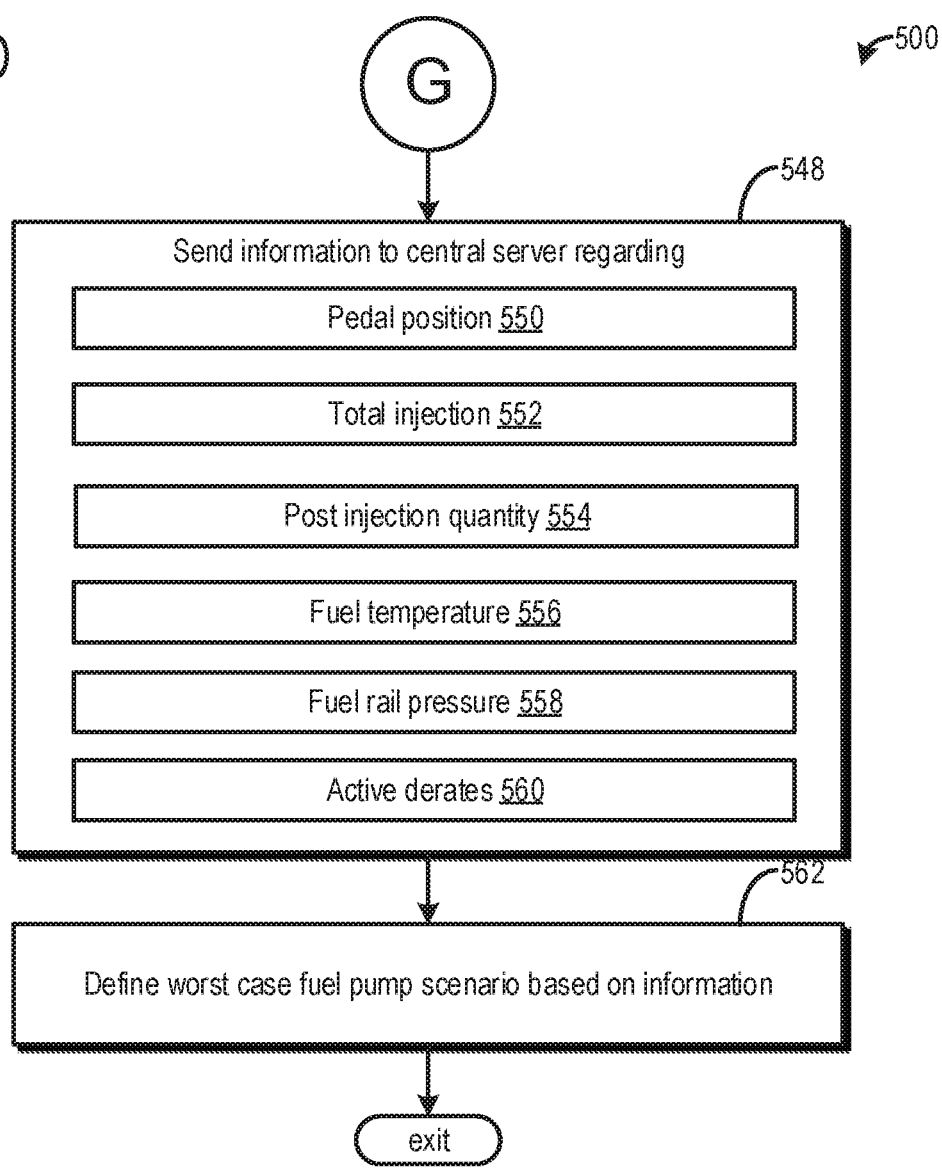
FIG. 5D shows a method for adjusting engine operating parameters in response to a filter regeneration post-injection.

Turning now to FIG. 5D, it shows a portion of sub-routine 500 for monitoring PF regeneration post-injection. The sub-routine 500 sends information to the central server at 548 regarding the pedal position at 550, total injection at 552, post-injection quantity at 554, fuel temperature at 556, fuel rail pressure at 558, and active derates at 560.

At 562, the sub-routine 500 defines a worst case fuel pump scenario based on the provided information. The central server may analyze the received information and determine which conditions promote a worst case fuel pump scenario. Conditions during a worst case fuel pump scenario (e.g., circumstance where a fuel pump capacity is limited and/or decreased) may include high fuel temperature, high post injection, and no derates.

As an example, the central server may update derate information based on information measured by the controller. The central server may signal the controller to make derates less restriction based (e.g., occur more frequently compared to prior to the update) to decrease a number of occurrences of worst case fuel pump scenarios. In one example, near fuel pump limits may occur if a target fuel rail pressure was not achieved or sustained or if torque producing injection quantity was limited to achieve target fuel rail pressure. If neither of the two scenarios are met, but a total commanded fuel quantity is above an upper threshold fuel limit, then a worst case fuel pump scenario may be active. As such, the upper threshold fuel limit may be based on fuel quantities corresponding to worse case fuel pump scenarios.

Turning now to FIG. 6, it shows a method 600 for determining vehicle tampering. In one example, if vehicle tampering is detected, then the method 600 may void a vehicle warranty.

The method 600 begins at 602 and determines, estimates, and/or measures current engine operating parameters. 602 may be substantially similar to 202 of method 200 of FIG. 2.

At 604, the method 600 includes determining if a fuel pump is injecting more than an upper threshold fuel amount. Fuel injections greater than the upper threshold fuel amount may lead to degradation of engine components, including but not limited to, a spark plug, fuel injector, cylinder walls, piston, and other components. In one example, a piston degradation may include the piston cracking due to the fuel injection exceeding the upper threshold fuel amount. If the fuel pump is not injecting over the upper threshold fuel amount, then the method 600 proceeds to 606 to maintain current engine operating parameters and does not send information to the central server.

If the fuel pump is injecting fuel quantities greater than the upper threshold fuel amount, then the method 600 proceeds to 608 and signals to the central server that the fuel pump is pumping more fuel than the upper threshold fuel amount.

At 609, the method 600 includes determining if standard components are detected. Standard components may include a stock fuel injector and/or a controller that has not been reprogrammed to increase a fuel injection amount. Otherwise, tampering may have occurred. Tampering may include modifying a controller and/or the fuel injector to increase a fuel injecting quantity, thereby increasing an engine power output. In one example, the fuel injector injecting more fuel than the upper threshold fuel amount is associated with a VIN of the vehicle. The fuel injector may be compared to other fuel injectors also injecting more fuel than the upper threshold fuel amount. Additionally, engine conditions of the different vehicles may be compared to determine any discrepancies between the vehicles. If there are discrepancies, and the discrepancies correspond to known tampering conditions, then tampering may have occurred (e.g., standard components not detected) and the method 600 proceeds to 614 to void a warranty due to vehicle tampering.

If stock components are detected and vehicle tampering has not occurred, then the method 600 proceeds to 610 to alert the driver that maintenance is desired. At 612, the method 600 includes adjusting engine operating parameters based on the fuel pumping injecting more fuel than the upper threshold fuel amount. In one example, the adjusting may include applying derates to the degraded fuel injector until maintenance is received. In this way, degradation of vehicle components may be mitigated and/or prevented until maintenance is received.

Turning now to FIG. 7, it shows a method 700 for monitoring panic braking and adjusting autonomous braking based on panic braking results.

The method 700 begins at 702, where the method 700 determines, estimates, and/or measures current engine operating parameters. 702 is substantially similar to 602 of FIG. 6 or 202 of FIG. 2. However, 702 may be different in that it also measures if a brake pedal is being depressed. This may be monitored by a brake pedal position sensor and/or a vacuum level of a brake booster. The vacuum level may decrease in response to the brake pedal being depressed.

At 704, the method 700 includes determining if a panic brake has occurred. If a vehicle speed decreases faster than a threshold brake rate, then a panic brake may have occurred. The threshold brake rate may be a speed over time (e.g., 10 MPH/second). If the vehicle speed decreased by 20 MPH/second, then a panic brake occurred. Alternatively, the panic brake may occur if the brake pedal is aggressively depressed, as determined by a brake pedal sensor, or if vacuum is consumed at a rate greater than a threshold vacuum consumption rate. If a panic brake is not occurring, then the method 700 proceeds to 706 to maintain current engine operating parameters and does not send data to the central server.

If a panic brake has occurred, then the method 700 proceeds to 708 to measure the distance between the vehicle and the object. Additionally or alternatively, a change in distance may be calculated by measuring an initial distance prior to the panic braking and a final distance after the panic braking. In some examples, the distance may be a distance between the vehicle and an object right before the panic braking is initiated.

At 710, the method 700 calculates the amount of distance needed to brake, using a panic (e.g., aggressive) brake, to prevent a collision.

At 712, the method 700 includes determining a difference between the distance needed and the distance prior to the panic brake being initiated.

At 714, the method 700 includes sending the above information to the central server. The central server may receive and compare panic braking information from a plurality of different vehicles. In one example, the central server compared panic braking between vehicles under similar ambient conditions. For example, vehicles panic braking in rain are compared to other vehicles panic braking in rain and are not compared to vehicles panic braking in dry weather conditions. Additionally or alternatively, panic braking may be compared for vehicles traveling at similar speeds prior to the panic braking. For example, a vehicle traveling at 55 miles per hour prior to a panic brake may be compared to other vehicles traveling between a range of 50-60 miles per hour prior to a panic brake and are not compared to vehicle traveling outside of the range.

At 716, the method 700 includes adjusting an autonomous brake schedule according to average vehicle operator brake reaction. The average vehicle operator brake reactions may be determined by the central server comparing panic braking from different vehicle operators. The adjusting may further include ambient conditions such that autonomous panic braking during wet conditions may be different to autonomous panic braking during dry ambient conditions. In one example, autonomous panic braking during wet conditions may occur with a greater distance between the vehicle and the object compared to panic braking during dry ambient conditions.

In this way, a plurality of vehicle conditions may be measured and relayed to a central server for analysis. The central server may compare the information received to information received from other similar vehicles in similar conditions. If a deviation is found between the two sets of information and the deviation is determined to be a detrimental factor to one or more vehicle operating conditions, then the central server may signal a controller of the vehicle to alert a driver. The technical effect of sending vehicle conditions to the central server during or outside of a vehicle fault is to process the information and alert the driver of a likelihood of an impending component degradation. Thus, degradation of the component may be decreased and/or prevented, thereby expanding the lifetime of the vehicle along with decreasing a maintenance cost.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
sending information from a vehicle to an off-board data analysis system in response to a sensed fuel system pressure exceeding a threshold fuel system pressure;
receiving processed data from the off-board data analysis system identifying a set of operating conditions during which to display coaching instructions to an operator to reduce fuel system overpressure instances.

2. The method of claim 1, wherein the sensed fuel system pressure exceeding the threshold fuel system pressure increases a likelihood of the fuel system becoming degraded.

3. The method of claim 1, wherein sending information includes wirelessly sending the information to the off-board data analysis system from a controller with computer-readable instructions for:
sending fault data of the vehicle to the off-board data analysis system in response to a fault, and comparing one or more engine conditions accompanying the fault of the vehicle to engine conditions of other vehicles experiencing the same fault.

4. The method of claim 1, wherein displaying the coaching instructions includes using an in-vehicle messaging system for communicating with the operator, and where the coaching instructions inform the operator of driving behaviors increasing a likelihood of faults.

5. The method of claim 4, wherein the in-vehicle messaging system includes an infotainment system, a navigation system, or a GPS.

6. A method for an engine comprising:
comparing a fuel system pressure to a threshold fuel system pressure and displaying tailored coaching tips to a vehicle operator in response to the comparison, wherein the coaching tips are tailored based on the comparison during a tip-out or a tip-in, wherein the tailored coaching tips displayed in response to the comparison during the tip-out include instructing the vehicle operator to tip-out more slowly.

7. The method for the engine of claim 6, wherein displaying tailored coaching tips to the vehicle operator includes displaying the coaching tips on an in-vehicle messaging system.

8. The method for the engine of claim 6, further comprising a counter counting a number of incidents where the comparison includes the fuel system pressure exceeding the threshold fuel system pressure, and where tailored coaching tips are displayed in response to the counter exceeding a threshold count.

9. The method for the engine of claim 6, wherein the tailored coaching tips displayed in response to the comparison during the tip-in include instructing the vehicle operator to tip-in more slowly.

10. A method for an engine comprising:
comparing a fuel system pressure to a threshold fuel system pressure and displaying tailored coaching tips to a vehicle operator in response to the comparison; and
a counter counting a number of incidents where the comparison includes the fuel system pressure exceeding the threshold fuel system pressure, and where tailored coaching tips are displayed in response to the counter exceeding a threshold count, wherein the counter counts a duration the fuel system pressure exceeds the threshold fuel system pressure.

11. The method for the engine of claim 10, wherein the counter increases as the duration increases.

12. A method for an engine comprising:
comparing a fuel system pressure to a threshold fuel system pressure and displaying tailored coaching tips to a vehicle operator in response to the comparison; and
timing a duration and measuring a magnitude of the fuel system pressure exceeding the threshold fuel system pressure, and sending information to a central server regarding vehicle operator inputs and vehicle conditions.

* * * * *